March 17, 1925. 1,530,382
S. LIGOTZ
TEMPERATURE INDICATOR
Filed Aug. 24, 1923  2 Sheets-Sheet 1
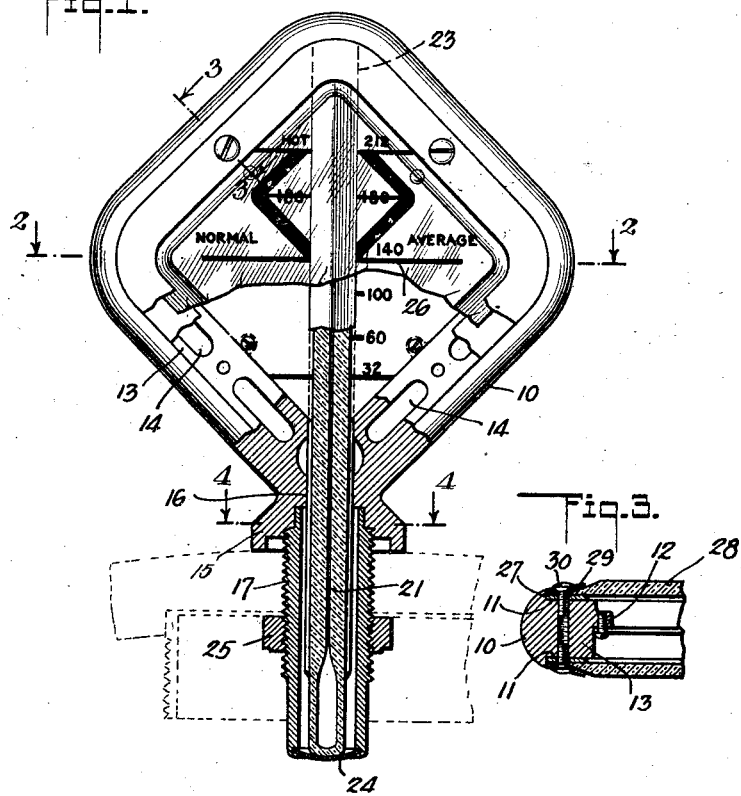
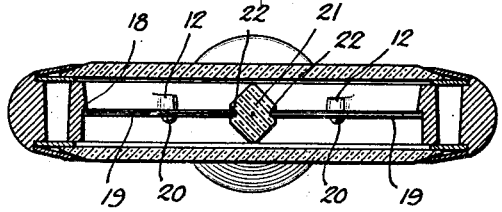
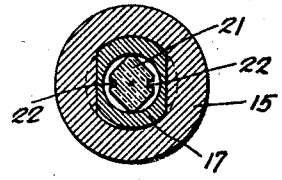
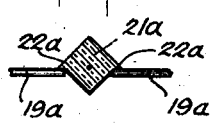
WITNESSES
INVENTOR
S. LIGOTZ
BY
ATTORNEYS March 17, 1925.
S. LIGOTZ
1,530,382
TEMPERATURE INDICATOR
Filed Aug. 24, 1923
2 Sheets-Sheet 2
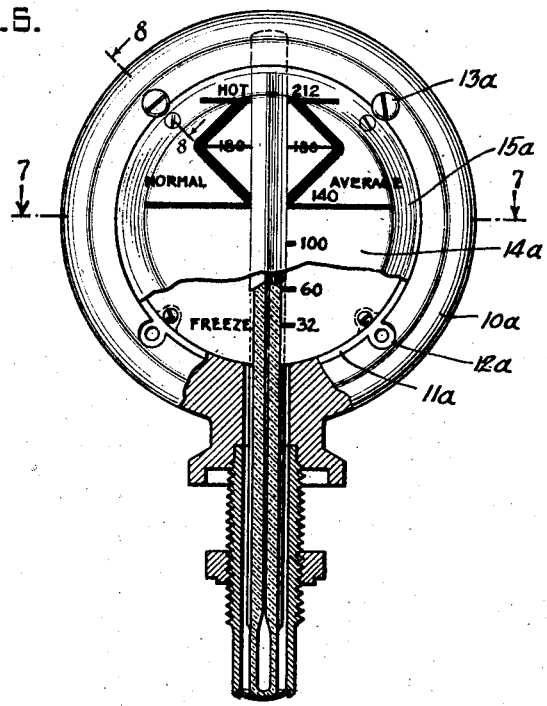
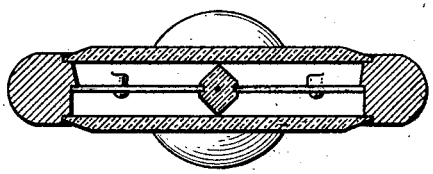
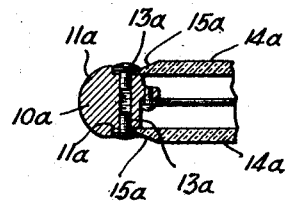
WITNESSES
INVENTOR
S. LIGOTZ
BY
ATTORNEYS Patented Mar. 17, 1925.

1,530,382

UNITED STATES PATENT OFFICE.

STEPHAN LIGOTZ, OF NEW YORK, N. Y.

TEMPERATURE INDICATOR.

Application filed August 24, 1923. Serial No. 659,199.

*To all whom it may concern:*

Be it known that I, STEPHAN LIGOTZ, a citizen of Austria, and a resident of the city of New York, borough of Manhattan, in the county of New York and State of New York, have invented a new and Improved Temperature Indicator, of which the following is a full, clear, and exact description.

This invention has relation to indicating devices and has particular reference to what are generally known as "motor meters" and adapted for use in connection with water cooled internal combustion engines, for the purpose of indicating the temperature of the water in the circulation system.

The present invention contemplates improvements in the general construction and arrangement of indicators of this character, some of the principal objects of which reside in the provision of a device by means of which the readings may be made from either side thereof; a device in which the thermometer tube functions to diffuse the light rays upon the dial from an illumination in advance of the car, whereby the indicia on the dial is visible to the operator of the vehicle; a device in which the readings are clearly visible from the freezing to the boiling points; a device in which the dial is centrally disposed and separated by the thermometer tube; and a device which may be constructed to secure the above mentioned advantages without materially adding to the cost of manufacture and ultimate sale price.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a front elevation of a temperature indicator constructed in accordance with the invention, parts being broken away to disclose the underlying structure.

Fig. 2 is a horizontal sectional view taken approximately on the line indicated at 2—2 in Fig. 1.

Fig. 3 is a fragmentary detail sectional view taken approximately on the line indicated at 3—3 in Fig. 1.

Fig. 4 is a horizontal sectional view taken approximately on the line indicated at 4—4 in Fig. 1.

Fig. 5 is a detail horizontal sectional view of a slightly modified form of thermometer tube.

Fig. 6 is a front elevation of a modified form of the device with parts broken away to disclose the underlying structure.

Fig. 7 is a horizontal sectional view taken approximately on the line indicated at 7—7 in Fig. 6.

Fig. 8 is a fragmentary detail sectional view taken approximately on the line indicated at 8—8 in Fig. 6.

Referring to the drawings by characters of reference, 10 designates the body of the indicator which is preferably cast or otherwise formed of a suitable material to constitute a frame having rabbeted portions 11 toward the inner side of its opposite faces and define an opening therethrough into which opening projects a plurality of supporting lugs 12. The web 13 which is defined between the rabbeted portions 11 is cut away or slotted at various points as at 14 for the purpose of lightening the body and reducing the amount of material required. At its lower end the frame is formed with an enlarged boss 15 through which a bore 16 extends and communicates with the central opening defined by the frame. A tubular exteriorly threaded stem 17 is secured to and depends axially from the boss 15, the bore of said stem communicating with the bore 16 of the boss 15. The inner edge of the web between the lugs 12 is provided with a continuous raised bead or shoulder 18 Figure 2, against which bead or shoulder and the lugs 12 the dial sections 19 are fitted and retained by means of screws 20 which are anchored in the lugs 12. The confronting edges of the dial sections 19 are spaced from each other to receive therebetween the thermometer tube 21 which is inserted through the aligned bores of the tubular stem 17 and the boss 15. The thermometer tube 21 is preferably of substantially diamond-shape in cross section and in the preferred embodiment is truncated at its opposite sides and formed with longitudinal grooves 22 which receive or fit over the spaced confronting edges of the dial sections 19. By making the thermometer tube of diamond-shape in cross section, the column of red alcohol which is used therein will be magnified when viewed from both sides of the device. The upper end of the thermometer tube is inserted through a recess 23 in the web 13 which recess communicates with the central opening and the said upper end is maintained in contact with the inner end of the recess 23 and held in place by a disk 24 suitably secured to the lower or outer end of the tubular stem 17. The device is adapted to be mounted upon the radiator cap which covers the filling nozzle of the radiator of a motor vehicle and said cap is apertured to receive therethrough the tubular stem 17, after which a nut 25 is threaded onto the stem to rigidly clamp the boss 15 against the upper side of the cap with the tubular stem projecting into the filling nozzle when the cap is in place. The dial sections 19 are inscribed on their opposite faces with the same suitable indicating indicia and graduations 26, so that the opposite faces of the dial are exactly alike, by means of which readings of the thermometer are readily made at either front or rear side. Within the rabbeted portions 11 suitable gaskets 27 are arranged upon which crystals 28 are positioned and held in place by retaining washers 29 through which washers and gaskets fastening screws 30 are passed and anchored in the web 13. Under this arrangement it will be observed that the transparent thermometer tube 21 separates the dial sections and exposes the fluid column completely between the freezing and boiling points to be read in connection with the indicia or graduations 26 on the dial face from either the front or rear of the indicator. Furthermore the position and arrangement of the thermometer tube with respect to the dials is such that any illumination in advance of the vehicle at night will be diffused laterally through the thermometer tube onto the opposite faces of the dial sections in order that the operator may readily observe the reading without resorting to the use of reflecting means. The bead or shoulder 18 serves to exclude the passage of the light around the outer edges of the dial sections so that no light can pass through the indicator except through the thermometer tube at the center.

In the modified form of thermometer tube 21ª illustrated in Fig. 5 the same is formed with laterally projecting shoulders 22ª in lieu of the grooves 22 whereby the dial sections 19ª in this instance rest against the shoulders instead of being received by the grooves.

In the modified form of the invention illustrated in Figs. 6, 7 and 8, the body 10ª is of annular or circular formation and is provided with narrow rabbeted portions 11ª adjacent the inner edge which communicate with circumferentially spaced recesses 12ª for the reception of the screws 13ª. In this instance the crystals 14ª fit snugly within the rabbeted portions 11ª while the heads of the screws engage directly with the beveled edges 15ª of the crystals. The remaining construction is substantially identical with that of the preferred embodiment and therefore the detailed description of the same has been omitted.

I claim:

1. In a temperature indicator for the cooling system of a motor vehicle a radiator cap, a frame mounted on said radiator cap and having a central opening communicating with the interior of said cap, a dial comprising a pair of sections each having graduations on its opposite faces, said sections being mounted medially within said frame with the inner edges of said sections in spaced relation, and a thermometer tube snugly fitted into the space between said dial sections with the lower bulb end of said thermometer tube extending through the frame and into the cap.

2. In a temperature indicator for the cooling system of a motor vehicle, a radiator cap, a frame mounted on said radiator cap and having a central opening communicating with the interior of said cap, a dial comprising a pair of sections each having graduations on its opposite faces, said sections being mounted medially within said frame with the inner edges of said sections in spaced relation, a thermometer tube snugly fitted into the space between said dial sections with the lower bulb end of said thermometer tube extending through the frame and into the cap, and a tubular element closed at its lower end, for housing the exposed bulb end of the thermometer and secured to the frame.

3. A temperature indicator for the cooling system of a motor vehicle comprising a supporting frame, a dial consisting of a pair of sections each having graduations on its opposite faces, said sections being mounted in said frame to afford a central space therebetween, and a thermometer tube mounted centrally in said frame with its bulb end protruding from the lower end of the frame and the remaining portion of said tube disposed in the central space between the dial sections.

4. A temperature indicator for the cooling system of a motor vehicle comprising a supporting frame, a dial consisting of a pair of sections each having graduations on its opposite faces, said sections being mounted in said frame to afford a central space therebetween, and a thermometer tube mounted centrally of said frame with its bulb end protruding from the lower end of the frame and the remaining portion of said tube disposed in the central space between the dial sections, said thermometer tube having means extending longitudinally thereof and at its opposite sides for interengagement with the spaced inner edges of the dial sections.

5. In a temperature indicator for the cooling system of a motor vehicle, a frame having an opening and a depending tubular element at its lower end adapted to extend through the radiator cap, the bore of said tubular element having communication with the opening defined by the frame, a graduated dial including a pair of sections each having graduations on its opposite faces, said sections being mounted medially within the frame with the inner confronting edges spaced apart a distance corresponding approximately to the diameter of said bore, and a thermometer tube extending through said bore and between the spaced confronting edges of the dial sections and completely filling said space, the bulb end of said tube protruding into the bore of said tubular element.

6. In a temperature indicator for the cooling system of a motor vehicle, a frame having an opening and a depending tubular element at its lower end adapted to extend through the radiator cap, the bore of said tubular element having communication with the opening defined by the frame, a graduated dial including a pair of sections each having graduations on its opposite faces, said sections being mounted medially within the frame with the inner confronting edges spaced apart a distance corresponding approximately to the diameter of said bore, a thermometer tube extending through said bore and between the spaced confronting edges of the dial sections and completely filling said space, the bulb end of said tube protruding into the bore of said tubular element, and means at the opposite sides of said thermometer tube interengaging with the edges of the dial sections.

7. A temperature indicating device comprising a supporting frame defining a central opening, a dial consisting of a pair of sections each having graduations on its opposite faces, said sections being mounted in said frame to afford a central space therebetween, and a thermometer tube mounted centrally in said frame with its bulb end protruding from the lower end of the frame and the remaining portion of said tube disposed in the central space between the dial sections.

8. A temperature indicating device comprising a supporting frame defining a central opening, a dial consisting of a pair of sections each having graduations on its opposite faces, said sections being mounted in said frame to afford a central space therebetween, and a thermometer tube mounted centrally in said frame with its bulb end protruding from the lower end of the frame and the remaining portion of said tube disposed in the central space between the dial sections, the said thermometer tube having means extending longitudinally thereof at diametrically opposite points for interengagement with the inner edges of the dial sections.

STEPHAN LIGOTZ.